United States Patent
Maier

[15] 3,676,927
[45] July 18, 1972

[54] METHOD OF MAKING A CONNECTOR PLUG

[72] Inventor: Robert Maier, Esslingen am Neckar, Staffelsweg 10, Germany

[22] Filed: Sept. 15, 1969

[21] Appl. No.: 857,757

[30] Foreign Application Priority Data

June 18, 1969 Germany......................P 19 30 806.6
Dec. 23, 1968 Germany......................P 18 16 614.8

[52] U.S. Cl....................................29/629, 29/511, 29/517, 29/418, 29/417, 29/630 A, 339/252 P, 339/252 T, 339/262 P, 339/220 T
[51] Int. Cl.......................................................H02q 15/00
[58] Field of Search..................29/630 A, 629, 628, 10, 511, 29/597, 418, 630 C; 339/262, 252; 10/86; 133/119

[56] References Cited

UNITED STATES PATENTS

| 2,004,555 | 6/1935 | Kleinmann et al.................339/252 P |
| 3,204,213 | 8/1965 | Bauer.................................339/252 X |
| 3,255,430 | 6/1966 | Phillips..........................29/630 A UX |
| 3,263,305 | 8/1966 | Bultes et al....................29/630 G UX |
| 3,277,560 | 11/1966 | Frank et al............................29/630 D |
| 3,400,358 | 9/1968 | Brynes et al......................29/630 D X |
| 1,674,986 | 6/1928 | Norwood.....................................10/86 |
| 1,925,153 | 9/1933 | Rosborough.............................10/86 A |
| 2,280,821 | 4/1942 | Gray........................................10/86 A |
| 2,310,316 | 2/1943 | Renner.................................10/86 CL |
| 2,699,597 | 1/1955 | Apms.....................................29/630 C |

FOREIGN PATENTS OR APPLICATIONS 1,426,275  11/1966  France................................339/252 P Primary Examiner—John F. Campbell
Assistant Examiner—Robert Church
Attorney—Jennings Bailey, Jr.

[57] ABSTRACT

A plug or socket for a plug-and-socket connection is produced by forming a member which includes a main body portion having a plurality of longitudinally extending separate parts of substantially uniform cross section throughout their lengths and an end part connecting the longitudinally extending parts to each other at one end, and thereafter securing one end of the member in a connecting part. The member may be formed by drilling a longitudinally bore into a grooved rod with a radius at least as great as the radius of the roots of grooves running longitudinally of the member leaving a connecting part at one end. It may also be produced by bending an elongated member of semicircular cross section through 180° and securing the free ends in the connecting part by welding two rods of similar cross section at intervals, cutting off a part adjacent one of the welds, separating the resulting legs apart and then bringing them together in a connecting member.

1 Claim, 10 Drawing Figures

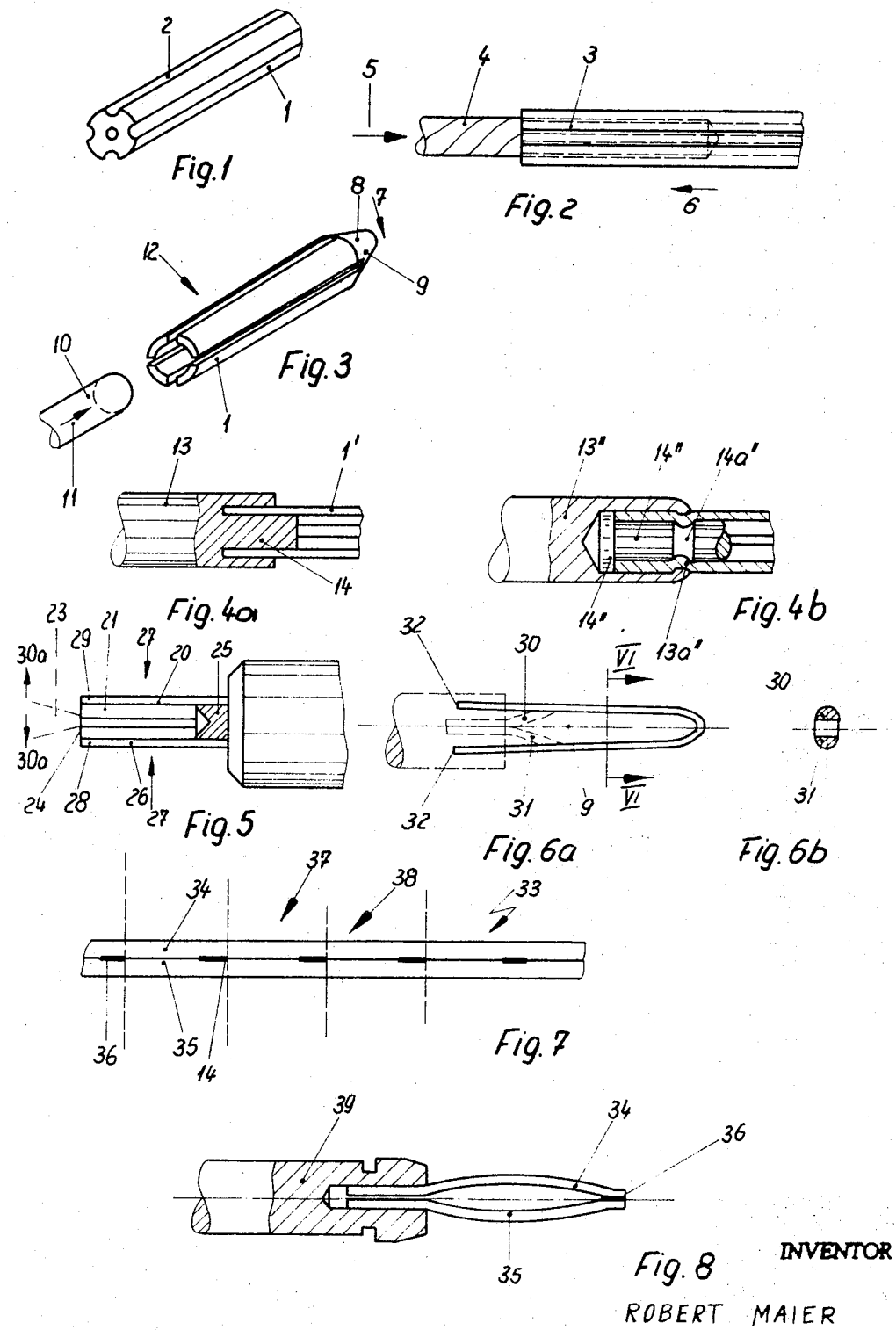

METHOD OF MAKING A CONNECTOR PLUG

The invention refers to a new method for making plug-and-socket connections, for example, for manufacturing plugs or bushes or sockets, and more particularly for making such connections for connecting electric wires within an electric circuit or for establishing a mechanical plug-in-socket connection, for connecting so-called testing wires or the like etc. The present invention refers especially to connections where the plugs consist of a socket-like or bush-like connecting part and of the part to be plugged in (in the proper sense of the word), said last-named part being constituted, in its turn, of several wire- or rod-like members or parts that are slightly springy towards the outside and which are fastened and secured to the connecting part or connector with those ends of them which are not to be plugged-in. Moreover, the invention refers to a contact plug made according to the above named new method and more particularly to a plug serving for connecting electric wires within an electric circuit for mechanically connecting several parts or portions.

It is an object of the present invention to create a connection of the kind here in question with which the plug has a good or optimal electric or mechanic contact with the socket that has to receive it.

Another object of the present invention is to provide a connection of the general character described with which the above said conditions are fulfilled even if the connections have diameters up to 4 mm or less.

Yet another object of the present invention is to provide a method of the above-described type with which to make the plugs or sockets there are used pieces or sections of profiled material shaped and machined in such a manner that the end parts on the one side only are interconnected, whereas the ends on the other side are free and independent from one another.

A further object of the present invention is to provide a method of the character described, with which for producing the plugs into a section of profiled material of suitable and corresponding length and having on its periphery at least one longitudinal and axially extending groove or several such grooves uniformly distributed along its circumference there is machined a central and axial groove beginning from the front end as seen in feed direction and reaching in radial direction to the base or bottom of the groove, the length of said central and axial bore corresponding at most to the length of said longitudinal groove or grooves and being preferably a little shorter than this length, whereupon the parts or portions obtained in this manner and being interconnected at one end only whereas their opposite ends are free and independent from one another are slightly bent or spread apart, and then the front end of the section subdivided in this manner into individual wire- or rod-like parts or portions interconnected at their rear end only is fixedly and securely connected with the connecting part, for example, by riveting.

A further object of the invention is to provide a method of the kind here in question with which the part to be plugged-in is made of two pieces of profiled wire having the same cross section and the same length and having, for example, a semicircular cross section, which are united at the ends to be plugged in, and which extend each other are slightly curved or arched or bent in opposite directions and outwardly, whereupon the free ends — whether united or not united — of the wire pieces or sections are fixedly and securely connected with the connecting part on the side opposite to the ends to be plugged in.

A still further object of the invention is to provide a method of the general character described with which there are used pieces or sections of profiled material with longitudinal grooves on its periphery into which sections a central and axial bore is machined having a diameter that surpasses the outer diameter of the contact plug, said bore reaching from the front end as seen in direction to the backward zone of each piece and having a diameter that corresponds approximately to the outer diameter of the contact plug, wherein the parts or sections made in this manner are bent inwards in radial direction and conveniently uniformly along the whole circumference, the free ends of the said parts or sections being slightly bent outwards in radial direction.

Yet another object of the invention is to provide a method and a device of the kind here in question which has the advantage that by means of it contact plugs and plug-in sockets or bushes of the type that is in question here can be produced not only in tiny dimensions but also in a most simple way, even mini-plugs with diameters of 1 mm or of dimensions still inferior to that size, plugs manufactured in that way being able to fulfill all conditions and particularly to ensure that, whenever they are plugged in, the different parts they consist of can never be bent asunder, distorted, and spread, or even, for want of elastic force, loosened in their sockets, the excellent contact or touch between the plug and the socket reducing the transition resistance to an amount that is practically of no importance.

A further object of the invention is to provide a method which is simple, the machine tools necessary for the production of the connecting devices in question being relatively simple, and the costs of their manufacture being low.

These and other objects, features, and advantages of the present invention will become further apparent from the following detailed description thereof, whereby in the drawings several embodiments of the invention are shown.

FIG. 1 is a rod made of a profiled material that can be used to manufacture a plug according to the invention, in a perspective view, FIG. 2 is a side view to show how the central and axial bore is machined into the said profiled material, FIG. 3 is a perspective view to illustrate how the individual parts or sections are cut off, spread and bent asunder or apart and how they are provided with the necessary prestress or pre-load, FIG. 4a and 4b show three possible ways to connect the parts to be plugged-in with the socket-like connecting parts, FIG. 5 is an example to demonstrate the use of the new method for manufacturing a socket or bushing in a partial vertically sectioned side view, FIG. 6a shows details of a part to be plugged in manufactured according to a variant of the invention partially in section, FIG. 6b shows the part to be plugged in in a section taken along the line VI—VI in FIG. 6a, FIG. 7 shows a piece or section of preformed profiled material consisting of two profiled wires which can be used according to a variant of the invention for manufacturing a plug according to FIG. 6a, FIG. 8 shows the axial section of a contact plug manufactured with the method according to the invention.

To realize a first variant of the method presented by the inventor, there is used the profiled rod-like profile material 1, which may consist, for instance, of yellow brass or some other highly conductive material, for example, material with circular cross section and eventually a small central bore, said material used having one or more longitudinal grooves 2 extending in axial direction and having, for example, rectangular or semicircular cross section, said grooves being formed or produced together with the material or being produced by broaching afterwards. In accordance with the new method a central and axial bore 3 is machined into the stick for which purpose a tool 4 is used that attacks or engages into the front end of the material to be worked as seen in the direction of the arrow 6, i.e. in direction of feed according to the arrow 5. The profiled material may have a small central bore-hole which secures a good guidance of the tool 4. The length of the bores 3 corresponds to the length of the longitudinal groove or grooves and is conveniently a little shorter than the length of the respective piece of material which is determined by cutting it off with a turning tool in accordance with the arrow 7 in FIG. 3. The diameter of the bore 3 must be so chosen that the bore extends in radial direction up to the base or bottom of the longitudinal grooves. Conveniently a rod of great axial length is introduced into the machine, whereupon a central bore of corresponding length is machined into the said rod and then a corresponding predetermined length of this rod is cut off, whereby the turning tool or cutter used for cutting off the rod can chamfer and bevel, at the same time, the end of the rod in such a way that the end of the rod diminishes in outward direction, as shown at 8 in FIG. 3. Subsequently, the parts or portions connected only at the rear end at 9 are slightly bent and spread apart to which purpose a mandrel 10 is used which is introduced according to the arrow 11 into the bored rod until the area of the front end is reached whereupon in the area of the rear end is applied an almost allround pressure 12 exerted upon the rod length which works radially towards the inside. Now the front end of the rod section subdivided by the axial grooves and the central bore into single wire- or rod-like portions connected only in the area of the rear end of the section is securely connected with the connecting part, by inserting the said front end into a socket-like connecting part 13' or 13'', and securing the said two parts together, for example, by riveting the one with the other. When riveting the section of profiled material and the connecting part together, there is conveniently used a stud-like counter part 14' or 14'' with an outside diameter that is either equal with, or smaller than, the diameter of the central and axial bore in the section of profiled material. With the embodiment according to FIG. 4a the stud 14 serving as counter part is shaped and constructed as an independent part and is inserted into the bushing serving as the connecting part by being concentrically arranged thereto, whereupon the section 1 of profiled material is inserted between the stud and the wall of the bushing. The counter part 14 (FIG. 4a) can also be longer and reach, for instance, up to the middle area of the part to be plugged in. In this case the individual segments of profiled material can not be pressed to a too great extent into the bush. According to FIG. 4b, the stud 14'' may be provided, for example, with a radial notch 14a'' so that eventually the plug can be mechanically riveted with the bush, the edges 13a'' being bent or flanged inwards.

After having inserted the plug part into the bush-like connecting part, the whole can be inserted into a bushing made of synthetic material or the like and fixedly or securely connected therewith by means of set-screws or the like; of course it is also possible to embed the whole into a wrapper or mantle of synthetic material by way of the press-mould or spray method known per se.

According to the invention the bushings that are receive the plugs can be manufactured by using the same profiled material and the same method that was used for the manufacture of the plug parts. The sections 20 in FIG. 5 are obtained by subdividing the original length of the respective profiled material which on its periphery has one or more longitudinal or axial grooves symetrically distributed over the circumference. Then a central and axial bore 21 is machined into the said sections 20 which has a diameter corresponding approximately to the diameter of the plug 23 which belongs to the plug-and-socket (or bushing) connection. The bore 21 is machined into the front end 24 of the section as seen in the direction of feed up to the rear zone 25 of the said section; in the radial direction it extends from the central longitudinal axis of the section to the base or bottom of the longitudinal groove or grooves 26, whereby its length may suitably correspond to, or be a little shorter than, the length of the groove or grooves. After having machined the bore into the section of profiled material and having thereby subdivided this section into individual portions or parts connected at the rear end only these parts or portions are bent slightly inward and in the radial direction according to the arrow 27, for example, by means of rolls or cylinders applied thereto in the middle of their length. In order to facilitate the insertion of the plug into the socket or bush, the open ends 28, 29 which are coordinated to the open axial end of the central axial bore may be then slightly bent off in a radial outward direction according to the arrows 30a.

The production of mini-plugs can be simplified with a variant of the invention. In that case for producing the part to be plugged in there are used two pieces or sections 30, 31 (FIG. 6a) of a profiled wire having corresponding cross sections, e.g. of semicircular shape, and lengths which are united with each other at the end to be plugged in, and extend parallel to one another yet slightly curved in opposite directions, whereupon the free ends 32, 32' of the part to be plugged in are securely connected, for instance, riveted with the connecting part. At the beginning there is taken an uninterrupted long piece of profiled wire and there are cut off sections that are twice as long as the parts 30 and 31. Such a section is bent round in the middle of its length so that the angle between the two halves is a little inferior to 180°, whereby these parts 30,31 after the connection with the connecting part having been performed are situated in a position analogue to that which is indicated by the dotted lines. In accordance with the further variant shown in FIG. 7 there can be taken at the beginning a continuous preformed length or section of profiled material 33. This length or section consists in reality of two profiled wires 34, 35, lying against each other, which are united with each other at intervals (see at 36) corresponding to the length of the sections desired, the connections being made, for example, by welding or soldering. Sections 37, 38 are cut off the length of profiled material prepared and manufactured as just described in such a manner that each section has a junction or connection point at one end 36 and two free and unconnected ends or tips at the other end of the profiled wires 34, 35. After the cutting off in this way, the two free and unconnected ends of the wire sections can be bent apart, if desired. FIG. 8 shows a plug which has been manufactured in the above described manner and which is inserted with the free end of the wire sections 34, 35 into a socket-like or bush-like connecting part 39 and is connected with it by riveting. In a further variant of the invention, the basic form of the profiled material is a continuous thread or cord of wire which consists of two undulated profiled wires lying against each other side by side, whereby the concave parts of the two wires lie against each other and the convex parts are opposite to one another and bent in outward direction.

A plug manufactured with the method according to the invention can be used not only for connecting electric wires, testing wires for instance and the like, but it may also serve as an adhesive or connecting plug for mechanical connections or fixtures, with which it is desirable to be able to loosen them without difficulty.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. Method of producing a plug part of a plug-and-socket connection which comprises a plug part and a socket part, said method comprising machining a central bore in a substantially cylindrical member having external grooves extending longitudinally thereof, said bore being of a radius at least as great as the distance of the bottom of said grooves from the axis of the member, the length of said bore being somewhat less than the length of said member so as to leave an end part at one end connecting the strips between the grooves to each other, thereby forming a member comprising a main body portion having a plurality of longitudinally extending separate parts of substantially uniform cross-section throughout their lengths separated by slots and an end part connecting said longitudinally extending parts at one end, the length of said slots being substantially greater than the diameter of the member, the other ends of said parts being free from each other, spreading said longitudinally extending parts away from each other, compressing inwardly the portions of the longitudinally extending parts remote from said end part, and securing the free ends of the longitudinally extending parts with an annular space in a bushing between the outer wall of the bushing and a stud.

* * * * *